United States Patent [19]

Turetta et al.

[11] Patent Number: 5,424,512

[45] Date of Patent: Jun. 13, 1995

[54] METHOD AND DEVICE FOR DETECTING THE PRESENCE OF A BODY, FOR EXAMPLE A SAUCEPAN, ON A GLASS CERAMIC COOKING HOB IN CORRESPONDENCE WITH A HEATING ELEMENT ASSOCIATED WITH SAID HOB

[75] Inventors: Daniele Turetta, Ispra; Franziscus Kokkeler, Malnate, both of Italy

[73] Assignee: Whirlpool Europe B.V., Veldhoven, Netherlands

[21] Appl. No.: 10,132

[22] Filed: Jan. 28, 1993

[30] Foreign Application Priority Data

Jan. 28, 1992 [IT] Italy .................. MI92A0147

[51] Int. Cl.6 .................. F24C 15/10; G05D 23/19; H05B 3/68; H05B 3/74
[52] U.S. Cl. .................. 219/464; 219/452; 219/518; 338/316
[58] Field of Search ............ 219/464, 452, 451, 518, 219/519, 458; 338/316

[56] References Cited

U.S. PATENT DOCUMENTS 4,334,135 6/1982 Smith .................. 219/518
5,136,277 8/1992 Civanelli et al. .................. 219/519
5,296,684 3/1994 Essig et al. .................. 219/518

FOREIGN PATENT DOCUMENTS 374868 6/1990 European Pat. Off. ............ 219/452
2645660 10/1990 France .................. 219/518
2831858 2/1980 Germany .................. 219/518
3711589 10/1988 Germany .................. 219/452
3934157 4/1991 Germany .
493969 2/1956 Italy .................. 338/316
8900344 9/1990 Netherlands .................. 219/452

Primary Examiner—John A. Jeffery
Attorney, Agent, or Firm—Robert O. Rice

[57] ABSTRACT

A method and apparatus for detecting the presence of a saucepan on the hob plate of a glass ceramic cooking hob associated with a heating element includes measuring the variation in a physical characteristic of an electrical resistive element positioned between the heating element and the hob plate of the glass ceramic cooking hob caused by a body or saucepan being placed on the hob, the variation being evaluated by control means which, on the basis thereof, controls the heating element to change its operating parameters.

9 Claims, 4 Drawing Sheets

000
METHOD AND DEVICE FOR DETECTING THE PRESENCE OF A BODY, FOR EXAMPLE A SAUCEPAN, ON A GLASS CERAMIC COOKING HOB IN CORRESPONDENCE WITH A HEATING ELEMENT ASSOCIATED WITH SAID HOB

BACKGROUND OF THE INVENTION

This invention relates to a method for detecting the presence of a body, such as a saucepan or the like, placed on the hob plate of a glass ceramic cooking hob associated with a heating element located below this hob plate. The present invention also relates to a device for detecting the body on the hob.

Various devices and corresponding methods are known for detecting a saucepan or other container on a hob plate in correspondence with the relative heating element. These devices and methods are generally complicated and sometimes do not provide reliable detection of the presence of the saucepan on the hob.

In addition, the known devices do not enable the presence of a container on the hob plate of the cooking hob to be detected using only means and methods of simple implementation, allowing consequent control of the operation of the heating element located below the hob plate on which the container is placed.

SUMMARY OF THE INVENTION

An object of the present invention is to provide a method of the stated type which is of simple implementation and which allows reliable detection of the presence of a body or container placed on the hob plate of the glass ceramic cooking hob.

A further object is to provide a method of the stated type which enables the operation of the heating elements of a glass ceramic cooking hob to be controlled on the basis of the measured dimensions of the container or body placed on the hob.

A further object is to provide a method of the stated type which also enables the temperature of the glass ceramic cooking hob to be controlled, to hence control the food preparation on the basis thereof.

A further object of the invention is to provide a device of the stated type which is of simple construction and reliable use.

A further object is to provide a device of the stated type which enables the operation of the heating elements of the cooking hob to be controlled on the basis of the dimensions of the container or body placed on the hob.

A further object is to provide a device which costs less to make than analogous known devices and involves lower installation, maintenance and operating costs.

A further object is to provide a device having means for controlling the temperature of the hob plate of the glass ceramic cooking hob.

These and further objects which will be apparent to the one skilled in the art, are attained by a method of the aforestated type, consisting of measuring the variation in a physical characteristic of conductive means positioned between the electrically non-conductive hob plate and a corresponding heating element, the variation being caused by positioning a body or container on the hob plate associated with the heating element, the variation being measurable by way of a corresponding variation in an electrical signal passing through the conductive means, the latter electrical signal variation being evaluated by control means which control at least the heating element, the operating parameters of the latter being modified in relation to the variation in the electrical signal.

These objects are also attained by a device of the aforesaid type, having conductive means positioned between the hob plate and the corresponding heating element, the means being at least of open loop configuration and being connected to means for controlling the operation of at least the heating element, a physical characteristic of the conductive means varying following the positioning of a container on the hob plate associated with the heating element, the variation corresponding to the variation in a corresponding electrical signal passing through the means, this variation being measured by the control means, which consequently act on the heating element to modify its operating parameters.

DETAILED DESCRIPTION OF THE PREFERRED EMBODIMENT

Figure 1:
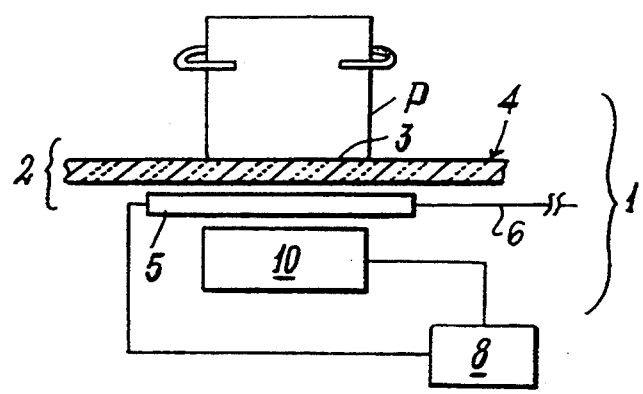
FIG. 1 is a schematic view of the device according to the invention.

With reference to FIG. 1, a glass ceramic cooking hob 1 comprises an electrically non-conductive hob plate 2 (of glass ceramic), on the top surface 4 of which there is a cooking zone 3. Below the hob plate 2, associated with the zone 3, there is a conductive element 5 connected to a usual electrical feed line 6. The conductive element 5 is connected to a control circuit 8 which also acts on at least one usual heating element 10 positioned below the conductive element (as can be seen from FIG. 1).

On using the glass ceramic cooking hob 1 by placing a container or saucepan P on the zone 3, the presence of the container disturbs the electrical field generated by the element 5 through which current flows. This gives rise to induced currents within the conductive element, to produce a variation in the voltage drop across it when no container P is placed on the hob plate 2.

This variation is measured by the circuit 8, which consequently acts on the element 10 to modify its heating power and hence proceed to the preparation of the food contained in the saucepan P.

More specifically, with reference to FIGS. 2 to 7 (in which parts corresponding to those of FIG. 1 are indicated by the same reference numerals) the conductive element 5 is a wire resistor 15 (see FIG. 4) arranged an open loop configuration in associated with the heating element 10. This resistor has two portions 15A and 15B placed at an angle between them above halogen lamps 16 defining the heating element 10 in the described example. The lamps 16 are of the linear type and are associated with a usual reflector element 17.

The resistor 15 (in the form for example of an open triangle) has an end 18, common to the portions 15A, 15B, associated with a support 20 formed preferably of ceramic material or other electrically insulating material. The support 20 is associated with a pin 21 carried by one end 22 of an elastic member 23, including in the preferred embodiment, at least one bracket 24 projecting from a shoulder 25 rising from a base 26 fixed (for example by screws 27 cooperating with holes 28 in the base) to the reflector element 17.

The free ends 29 and 30 of the portions 15A, 15B are associated with electrically insulating support pieces 31 removably positioned (for example by snap-fitting) in seats 33 in the element 17. The end 29 is electrically connected to the line 6, whereas the end 30 is connected to the circuit 8.

Finally, the element 17 has a connector block 35 for the electrical feed to the lamps 16.

The resistor 15 (or in general the conductive element 5) is connected into an electrical circuit 40 with which the control circuit 8, preferably of microprocessor type, is associated Specifically, in a first embodiment (see FIG. 2), the conductive element 5 is connected to a node 41 from which there extends an electrical branch 42 terminating in an usual oscillating circuit 43 (for example a usual Colpitts oscillator). The node 41 is connected to the collector 47 of a transistor 48, the base 49 of which is connected to a voltage divider 50, including resistors 50A and 50B. The emitter 51 of the transistor 48 is connected to the collector of a second transistor 54, the base 55 of which is connected to the oscillator or oscillating circuit 43.

The emitter 56 of the transistor 54 is connected to a node 57; this node is connected to a resistor 58 connected to earth at 59, and to the control circuit 8. The latter is connected to a element 60 for controlling the heating element 10 (for example a voltage regulator if the heating element is at least one halogen lamp, or a solenoid valve if the heating element is at least one gas burner).

In a second embodiment (see FIG. 3, in which the elements already described in FIG. 2 carry the same reference numerals), the circuit 40 includes a further transistor 63 connected between the circuit 8 and the node 57. Specifically, the base 64 of this transistor is connected directly to the node 57, the collector 65 is connected to a resistor 67 connected to the line 6, and the emitter 66 is connected to the circuit 8.

The first embodiment of the circuit 40 (FIG. 2) allows analog control of the circuit 8 whereas the second embodiment (FIG. 3) allows digital control of this circuit.

With both these embodiments the control is such that the circuit 8 is able to set only two states (on or off) of the heating element 10.

Figure 2:
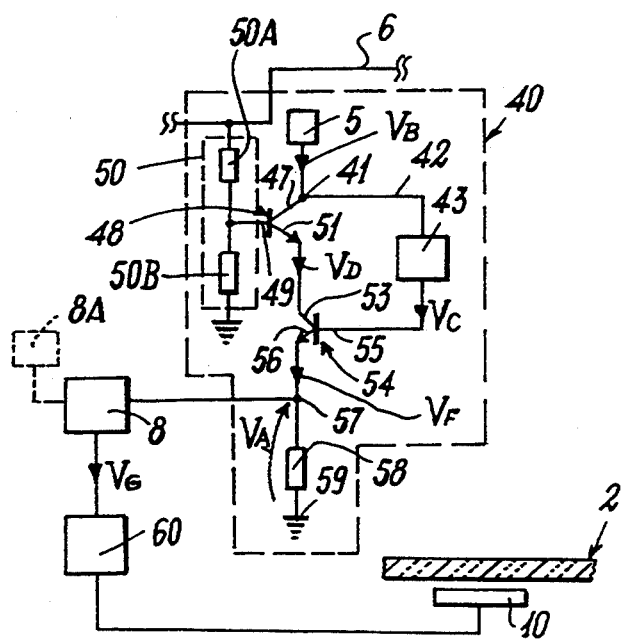
FIG. 2 shows a first embodiment of the device of FIG. 1.
Figure 3:
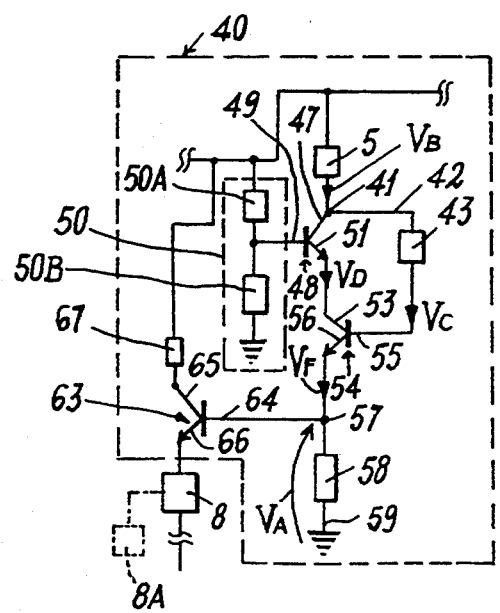
FIG. 3 shows a second embodiment of the device of FIG. 1.
Figure 4:
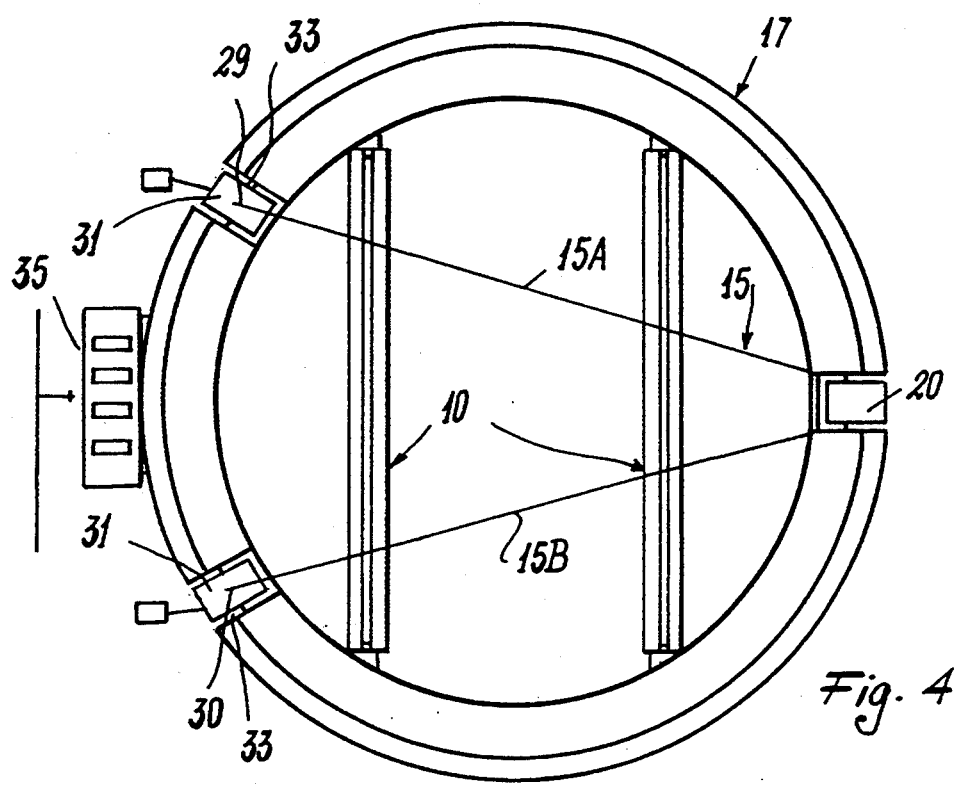
FIG. 4 is a view from above of a usual heating element for a glass ceramic cooking hob with which a part of the device of the invention is associated.
Figure 5:
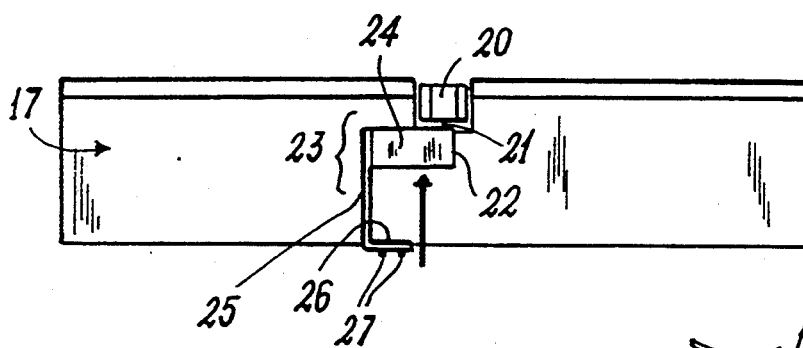
FIG. 5 is a front view of the heating element of FIG. 4.
Figure 6:
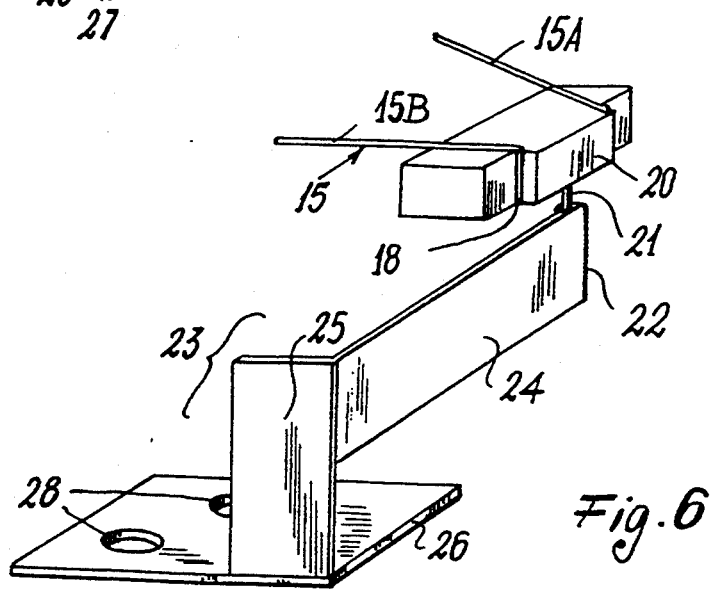
FIG. 6 is a detailed view of part of the element of FIG. 4.

Specifically, if no saucepan is placed on the hob plate 2, the voltage $V_A$ across the ends of the resistor 58 and sensed by the base 64 of the transistor 63 of FIG. 3 has a constant value (for example between 0 and 2 V) such as to maintain this transistor in its inhibited state. In the latter case no signal is emitted by the emitter 66 and the circuit 8 detects the lack of the saucepan P on the hob plate 2. However in the case of FIG. 2, maintaining the signal $V_A$ fed to the circuit 8 within a suitable voltage value (for example 0-2) does not enable this circuit (operating with comparison algorithms) to detect the presence of the saucepan P on the hob plate 2.

It will now be assumed that the saucepan is placed on the hob plate.

In this case, the (generally metal) mass of such a container modifies the electrical field generated by the conductive element 5, with the result that current is induced in this element by virtue of known physical phenomena.

This causes a variation in a signal $V_B$ fed to the node 41. From the latter, corresponding signals reach the oscillator 43, and the transistor 48 via its collector 47. Respective signals $V_C$ and $V_D$ are fed from these latter to the transistor 54. As a result of the, from this latter transistor there emerges a signal $V_F$, part of which flows from the node 57 to the resistor 58.

There is, therefore, an increase in the voltage drop across the resistor with the result that the voltage $V_A$ across its ends varies from that when the saucepan P is not present on the hob plate 2. Following this, with reference to FIG. 2, the voltage sensed by circuit 8 increases (for example to within a range of 2-5 V). Using suitable comparison algorithms, this causes the circuit 8 to detect the presence of the saucepan P and generate a signal $V_G$ directed towards the element 60 which controls the heating element 10. This signal modifies the state of the said element 60 (for example it opens the solenoid valve for the gas to the burner or increases the feed voltage to the halogen lamps 16) and therefore the state of the heating element. The latter, for example, passes from a state of inactivity to a state of maximum power to allow preparation of the food contained in the saucepan P. This happens if the operating knob or the heating element has been previously moved into the position for activating the element. In this respect, the knob is associated with a lighting member (for example a lamp, not shown) which is activated in known manner when a saucepan P is placed on that zone 3 whose element 10 is controlled the knob. The activation is preferably effected by the circuit 8.

Likewise, in FIG. 3 the variation in the voltage $V_A$ at the node 57 causes saturation of the transistor 63, which consequently generates a signal at the emitter 66, which reaches the circuit 8. This circuit is therefore activated and operates on the element 60 in the aforesaid manner.

Figure 7:
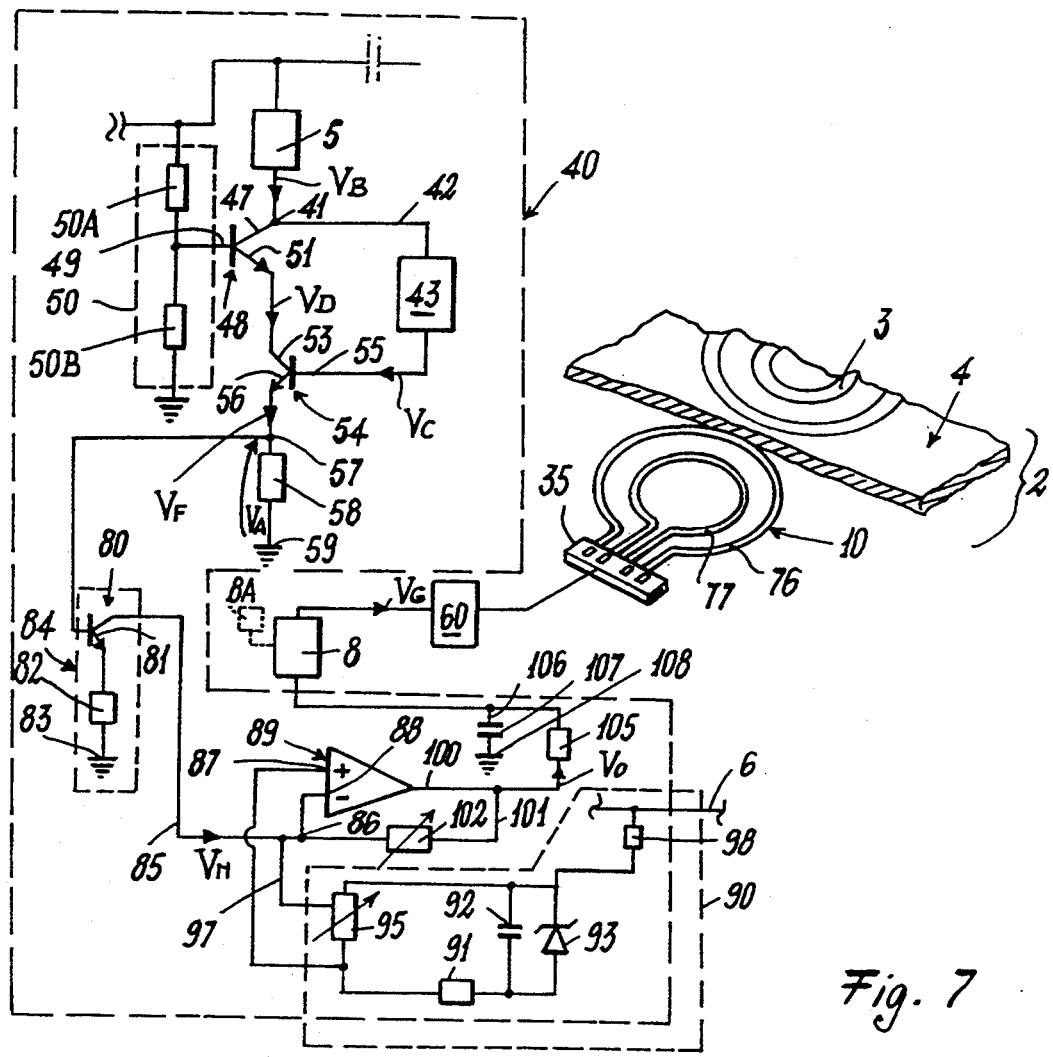
FIG. 7 is a schematic view of a third embodiment of the device according to the invention.

FIG. 7 shows a third embodiment of the circuit 40. In this figure, parts corresponding to those of the previously cited figures are indicated by the same reference numerals.

In the figure under examination, the circuit 40 allows the power of the heating element to be regulated on the basis of the dimensions of the saucepan P. In this case, the heating element 10 includes at least two heat-generating members 76 and 77 (electrical resistors or halogen lamps) of substantially annular form arranged one within the other. By selectively activating these members the cooking zone can be limited (for example by activating only the inner member 77) or the heating power can be modified (by selectively activating the inner or outer member). In the circuit 40 of FIG. 7, the node 57 is connected to a transistor 80, the emitter 81 of which is connected to a resistor 82 connected to earth at 83. The transistor 80 and the resistor act as a current amplifier 84.

An electrical branch 85 is connected to the transistor, to terminate in a node 86 to which the inverting input 88 of an operational amplifier 89 is connected. The non-inverting input 87 of the latter is connected to a circuit part 90 comprising a resistor 91, a capacitor 92 and a zener diode 93, these being connected together in parallel. The part 90 includes a variable resistor 95 which can be adjusted to define the lower value of a range of voltage (or another analogous quantity), for example 0-15 V within which the circuit 8 does not detect the presence of any saucepan P on the hob plate 2.

The circuit part 90 is connected to the line 6 via a resistor 98. Finally, the circuit part 90 is connected to the branch 85 via an electrical branch 97. This circuit part removes any disturbances in the signal $V_N$ fed to the amplifier 89 by superimposing on this signal a more stable one.

The output 100 of the amplifier 89 is fed back along an electrical branch 101 including at least one variable resistor 102 which can be adjusted to define the upper value of the range of voltage (or other analogous quantity) within which the presence of the saucepan P on the hob plate 2 is detected.

Said output 100 of the amplifier 89 is connected to a resistor 105 and to an electrical branch 106 having a capacitor 107 connected to earth at 108. The branch 106 then terminates in the control circuit 8.

The operation of the circuit shown in FIG. 7 is identical to that shown in FIG. 2 as far as the generation of the signal $V_A$. This signal varies as a function of the disturbance to the electrical field generated by the resistor 5 as a result of positioning saucepans or containers of different dimensions on the hob plate 2. For example, if the saucepan has a relatively small diameter, the variation in the signal $V_A$ (with respect to the value with the saucepan absent from the hob plate 2) is less than that of the same signal generated after positioning a large saucepan on the hob plate.

The signal $V_N$ which reaches the amplifier in the two stated cases (small and large saucepan) then either falls or does not fall within the band of voltage (or corresponding quantity) the lower limit of which is defined by adjusting the variable resistor 95 and the upper limit of which is defined by adjusting the variable resistor 102.

Depending on the relative position of the signal $V_N$ within the band, the amplifier 89 generates a signal $V_O$ the value of which varies on the basis of the size of the saucepan P placed on the hob plate 2. The signal $V_O$ is suitably integrated by the resistor 105 and capacitor 107 to make it "acceptable" to the circuit 8. The latter, using a comparison algorithm and depending on the value of the signal $V_O$, selectively operates the members 76 and 77 to heat the saucepan P, possibly without activating that member above which the saucepan does not reach. As already stated, in the examples described heretofore, adjustment knobs located on a control panel (not shown) enable the user to adjust the heating power of the element 10. These knobs are preferably connected to the circuit 8.

Consequently, if with the knob positioned at any point corresponding to a precise requested heating power the circuit 8 does not detect any saucepan on the hob plate, the circuit interrupts or sets to a minimum the feed (electricity or gas) to the element 5. This is the case for all the described embodiments of the circuit 40. Preferably, the circuit takes this action a suitable predetermined time after the circuit 8 no longer detects the presence of the saucepan (in the manner heretofore described). A suitable timer 8A connected to the circuit 8 enables the latter to operate in the stated manner. The same conductive element 5 (or at least its "linear" portion 15A or 15B) enables the temperature of the heating element 10 and therefore the heating power fed to the saucepan or container P on the hob plate 2 to be controlled.

Figure 8:
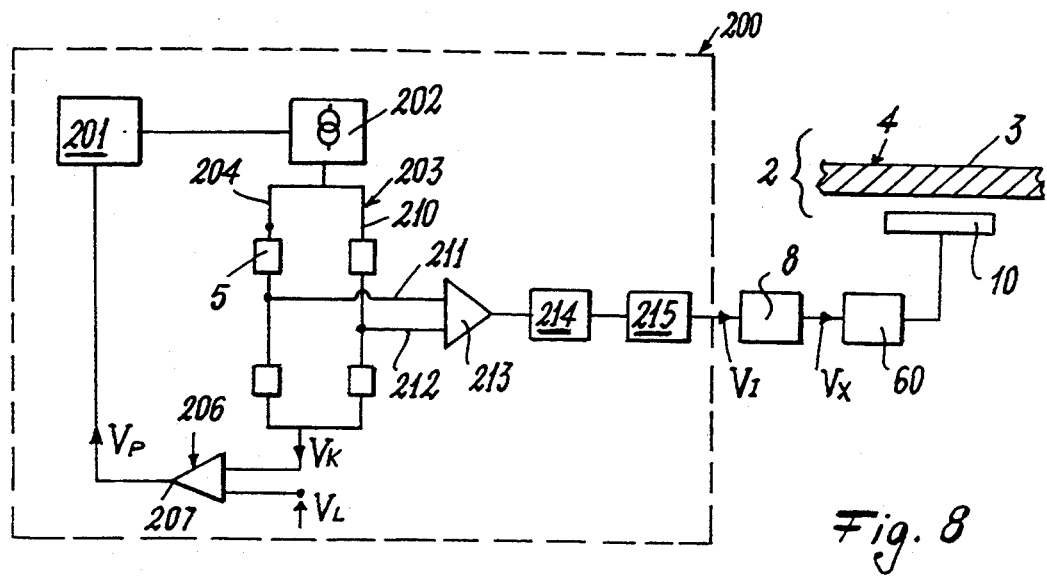
FIG. 8 is a block diagram showing a fourth embodiment of the device according to the invention.
Figure 9:
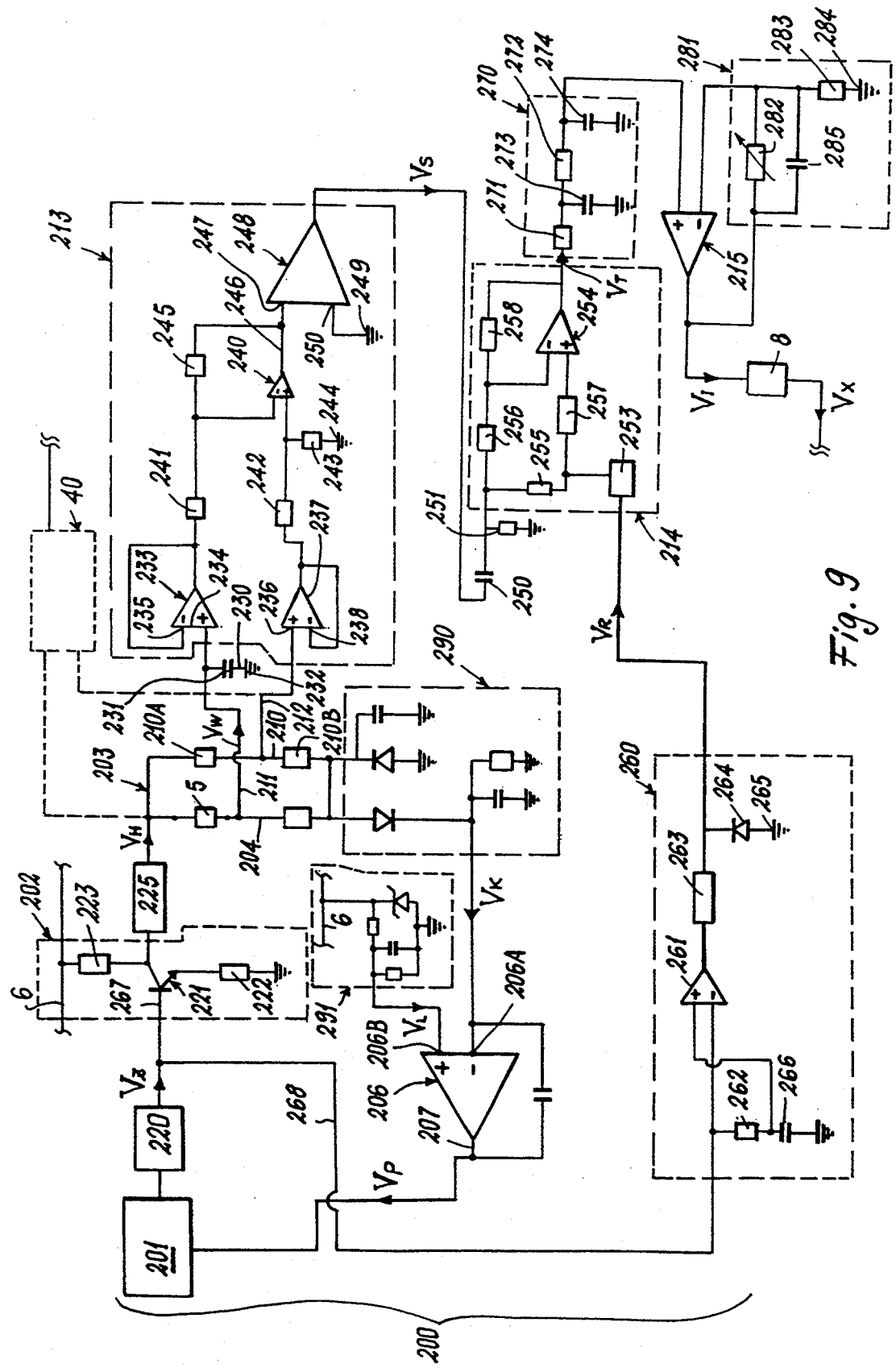
FIG. 9 is a detailed representation of a particular arrangement of the device embodiment shown in FIG. 8.

This application of the element 5 is shown in FIGS. 8 and 9. In these figures, parts corresponding to those of the already described figures are indicated by the same reference numerals.

In FIG. 8, the block diagram represents a circuit 200 with which the element 5 is associated for this temperature measuring function.

The 200 comprises an oscillator 201, for example including a Schmidt trigger and a current generator 202 connected to a resistance bridge 203, one arm of which comprises the resistor 5. The bridge 203 is connected to a comparator 206 in which a signal $V_K$ from the bridge is compared with a reference signal $V_L$. The output 207 of the comparator 206 is connected to the oscillator 201; therefore on the basis of the comparison between $V_K$ and $V_L$, this comparator generates a signal $V_P$ which controls the operation of the oscillator 201 by adjusting it as required.

The branch 204 (or diagonal) and the branch 210 of the bridge 203 are connected to electrical branches 211 and 212 terminating in a differential amplifier 213, the output of which is connected to a synchronous modulator 214 connected to an exit amplifier 215. The latter is connected to the circuit 8.

FIG. 9 shows in greater detail a preferred embodiment of the circuit 200 of FIG. 8. In this figure, parts corresponding to those described in FIG. 8 are indicated by the same reference numerals.

This embodiment of the invention comprises a bandwidth limiting filter 220 connected to the oscillator 20 and defined by resistors and capacitors, not shown. The filter 220 is connected to a transistor 221 acting as a current amplifier and connected to resistors 222 and 223. The latter and transistor 221 define the current generator 202.

Downstream of the latter there is a further filter 225 to filter, signals of different frequency. This filter (including electrical components such as inductors and capacitors) separates electrical signals of different frequencies (for example of 10 MHz and 1 KHz) used respectively for detecting containers on the hob plate 2 of the cooking hob 1 and for measuring the temperature of the heating elements 10 (and therefore of hob plate 2).

The filter 225 is connected to the bridge 203. The branches 204 and 210 of the latter are connected to branches 211 and 212. A further branch 230 including a capacitor 231 connected to earth is connected to the branch 211. The latter terminates at the non-inverting input 234 of an operational amplifier 233, the output of which is fed back to its inverting input 235. This amplifier operates as a non-inverting buffer.

Likewise, the branch 212 terminates at the non-inverting input 236 of an operational amplifier 237 with feedback to its inverting input 238. This amplifier also operates as a non-inverting buffer.

The buffers 233 and 237 are connected to a first operational amplifier 240 via resistors 241, 242 and 243, the latter being connected to earth at 244.

Via a further resistor 245, the buffer 233 is connected to the output 246 of the amplifier 240, which is connected to the inverting input 247 of a second amplifier 248, the non-inverting input 250 of which is connected to earth at 249.

These buffers and the two amplifiers 240 and 248 define the aforesaid differential amplifier 213.

The amplifier 248 is connected to the synchronous demodulator 214 via a capacitor 250 and a resistor 251 which integrate the output signal $V_S$ of the amplifier 213.

The demodulator 214 includes a switch member 253, an operational amplifier 254 and a plurality of resistors 255, 256, 257 and 258, of which the latter feeds back to said amplifier 254. The switch member (preferably a static switch) is controlled by a circuit part 260 which includes a comparator 261, resistors 262, 263, a diode 264 connected to earth at 265 and a capacitor 266. The comparator 261 compares a signal $V_Z$ fed to the base 267 of the transistor 221 (via an electrical branch 268) with its mean value, this comparison being enabled by the resistor 262 and the capacitor 264. From this comparison, the comparator generates a control signal $V_R$ for opening or closing the switch member 253. In this manner, the signal $V_S$ is sampled at precise time periods synchronized with the generation of the signal $V_Z$ by the oscillator 201.

A compared and synchronized signal $V_T$ is emitted by the demodulator 214 and reaches a circuit block 270 including resistors 271 and 272 and corresponding capacitors 273 and 274. This block filters the signal $V_T$ to make it acceptable to the control circuit 8, which it reaches after amplification by the amplifier 215. The latter obtains feedback from a circuit block 281 including a variable resistor 282 and a fixed resistor 283 (connected to earth at 284), and a capacitor 285. The resistor 282 allows the amplifier gain to be varied by adjusting it in accordance with the desired control signal $V_X$ which the circuit 8 emits in the direction of the control element (not shown in FIG. 9) of the heating element (also not shown).

The bridge 203 is connected to a circuit part 290 which rectifies the bridge output signal $V_K$ fed to the comparator 206. The latter receives the signal $V_L$ from a circuit block 291. It should be noted that the signal $V_K$ is taken from the branch 204 of the bridge 203, the branch 210 of the latter comprising high-resistance resistors 210A and 210B. This signal corresponds substantially to the mean value of a signal $V_H$ originating from the current generator 202.

On the basis of the comparison between $V_K$ and $V_L$, the comparator 206 generates the signal $V_P$ which controls the oscillator 201. This control is effected in such a manner that the signal $V_K$ reaching its inverting input 206A equals the signal $V_L$ reaching its non-inverting input 206B.

The operation of the circuit 200 is apparent from the aforegoing description.

When the temperature of the resistor 5 varies, its resistance also varies. Consequently the signal $V_W$ originating from the bridge 203 via the branch 211 also varies. As a result of this, the signal $V_S$ and the signal $V_I$ reaching the circuit 8 from the amplifier 215 vary.

This variation is interpreted by circuit 8 (which as stated is preferably of microprocessor type), using comparison algorithms, as a variation in the temperature of the heating element 10 or of the cooking zone 3 of the hob plate 2. Therefore, following a request by the user for a defined heating power, the circuit 8 acts on the element 10 to modify its operation to accord with the requested power.

Likewise, if any variation occurs in the temperature of the zone 3 during food preparation (for example because the water in saucepan P has completely evaporated or the food in the saucepan is burning, or because the water in the saucepan has boiled over onto the hob plate 2) there is a consequent variation in the resistance of the resistor 5. Using usual comparison algorithms, this is considered by the circuit 8 as an undesirable happening to the food. Consequently, the circuit 8 acts on the heating element 10 corresponding to that zone and interrupts its operation. A possible acoustic and/or lighting warning device (not shown) associated with the hob plate or the actual lighting member associated with the knob are activated by said circuit 8 to warn the user that the food or its preparation has undergone a disturbance.

As can be seen in FIG. 9, the circuit 40 can be coupled with the circuit 200, the overall arrangement then being able to both measure the temperature of the cooking zone 3 or heating elements (for their protection), and detect the presence of a container placed on the glass ceramic hob plate.

The circuit 40 is also connected to the circuit 8 as already stated in relation to the previously described figures. Preferably, a single circuit 8 is able to control the operation of a plurality of heating elements 10 associated with one and the same glass ceramic hob plate.

Various embodiments of the invention have been described. However further different embodiments can be provided (for example in which the variation in the physical characteristic of the current-carrying element is evaluated directly), and are to be considered as falling within the scope of the present invention.

What is claimed is:

1. A device for detecting the presence of a food container on a glass ceramic cooking hob within a cooking zone on a hob plate of said glass ceramic cooking hob, below said hob plate there being provided at least one heating element in correspondence with said cooking zone, said device comprising conductive means positioned between the hob plate and the corresponding heating element, said conductive means being at least of open loop configuration and being connected to control means for controlling the operation of at least said heating element, a physical characteristic of said conductive means varying following the positioning of the container on the hob plate in correspondence with said heating element, said variation corresponding to a variation in a corresponding electrical signal passing through said means, this variation being measured by the control means, which consequently act to control the heating element to modify its operating parameters, said conductive means comprising an electrical resistor associated with a support for the heating element and positioned above the heating element, said electrical resistor of filiform type and associated with a plurality of supports, at least one of which is elastically movable relative to a reflecting element which also acts as the support for the heating element.

2. A device for detecting the presence of a food container on a glass ceramic cooking hob within a cooking zone on a hob plate of said glass ceramic cooking hob, below said hob plate there being provided at least one heating element in correspondence with said cooking zone, said device comprising conductive means positioned between the hob plate and the corresponding heating element, said conductive means being at least of open loop configuration and being connected to control means for controlling the operation of at least said heating element, a physical characteristic of said conductive means varying following the positioning of the container on the hob plate in correspondence with said heating element, said variation corresponding to a variation in a corresponding electrical signal passing through said means, this variation being measured by the control means, which consequently act to control the heating element to modify its operating parameters, said conductive means comprising an electrical resistor associated with a support for the heating element and positioned above the heating element, said electrical resistor having free ends associated with first and second removable supports associated with the support for the heating element, at least one portion of said resistor being associated with a third support carried by an elastic member fixed by one of its parts to said support for the heating element.

3. A device for detecting the presence of a food container on a glass ceramic cooking hob within a cooking zone on a hob plate of said glass ceramic cooking hob, below said hob plate there being provided at least one heating element in correspondence with said cooking zone, said device comprising conductive means positioned between the hob plate and the corresponding heating element, said conductive means being at least of open loop configuration and being connected to control means for controlling the operation of at least said heating element, a physical characteristic of said conductive means varying following the positioning of the container on the hob plate in correspondence with said heating element, said variation corresponding to a variation in a corresponding electrical signal passing through said means, this variation being measured by the control means, which consequently act to control the heating element to modify its operating parameters, said conductive means comprising a resistor in the form of an open triangle having rectilinear portions positioned above the heating element.

4. A device for detecting the presence of a food container on a glass ceramic cooking hob within a cooking zone on a hob plate of said glass ceramic cooking hob, below said hob plate there being provided at least one heating element in correspondence with said cooking zone, said device comprising conductive means positioned between the hob plate and the corresponding heating element, said conductive means being at least of open loop configuration and being connected to control means for controlling the operation of at least said heating element, a physical characteristic of said conductive means varying following the positioning of the container on the hob plate in correspondence with said heating element, said variation corresponding to a variation in a corresponding electrical signal passing through said means, this variation being measured by the control means, which consequently act to control the heating element to modify its operating parameters, said conductive means associated with at least one electrical circuit operating on an electrical signal passing through said conductive means to generate an output signal able to be used by the control means for controlling the operation of the heating element, said electrical circuit comprising an oscillating circuit, a resistor which is connected to earth, a signal across said resistor which is fed to the control means, and comparison means which operate on the electrical signal across the resistor and compare this signal with a preset range of values to quantify the variation in the electrical signal in the conductive means, these comparison means generating another electrical signal which enables the control means to continuously vary the parameters and the mode of operation of the heating element.

5. A device for detecting the presence of a food container on a glass ceramic cooking hob within a cooking zone on a hob plate of said glass ceramic cooking hob, below said hob plate there being provided at least one heating element in correspondence with said cooking zone, said device comprising conductive means positioned between the hob plate and the corresponding heating element, said conductive means being at least of open loop configuration and being connected to control means for controlling the operation of at least said heating element, a physical characteristic of said conductive means varying following the positioning of the container on the hob plate in correspondence with said heating element, said variation corresponding to a variation in a corresponding electrical signal passing through said means, this variation being measured by the control means, which consequently act to control the heating element to modify its operating parameters, at least one portion of said conductive means connected into a resistance bridge, a variation in the balance of this bridge consequent on the variation in the physical characteristic of said conductive means being evaluated by comparison means connected to demodulation and synchronization means, the electrical circuit formed thereby generating as output a signal to be received by the control means and enabling the control means to evaluate the temperature of the cooking zone.

6. A device as claimed in claim 5, characterized in that the resistance bridge is connected to a comparator member arranged to compare an electrical signal leaving said bridge with a settable reference signal, said comparator member generating another output signal which controls and adjusts the operation of an oscillating circuit connected to a current generator connected to said bridge.

7. A device as claimed in claim 5, characterized in that the electrical circuit comprises: first filter means operating on a signal generated by an oscillating circuit and positioned upstream of the current generator; and second filter means positioned between the current generator and the bridge in order to separate electrical signals of different frequencies, to enable a temperature of the cooking zone to be measured, and the presence of the container on said zone to be detected.

8. A device as claimed in claim 5, characterized in that the demodulation and synchronization means are connected to a circuit part which measures an electrical signal directed from the oscillating circuit to a current generator and compares the electrical signal directed from the oscillating circuit with a mean value of said signal, said circuit part causing the demodulation and synchronization means to sample an output signal from the comparison means in synchronism with the generation of the electrical signal by the oscillating circuit.

9. A device as claimed in claim 5, characterized in that the control means is connected to the electrical circuit in which at least one portion of the conductive means is contained within a resistance bridge arranged to evaluate and control the food preparation.

* * * * *